US012718409B2

(12) United States Patent
Saito

(10) Patent No.: US 12,718,409 B2
(45) Date of Patent: Aug. 25, 2026

(54) INFORMATION MANAGEMENT SYSTEM, CENTER, INFORMATION MANAGING METHOD, AND STORAGE MEDIUM STORING PROGRAM

(71) Applicant: DENSO CORPORATION, Kariya-city (JP)

(72) Inventor: Ryota Saito, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 45 days.

(21) Appl. No.: 18/750,075

(22) Filed: Jun. 21, 2024

(65) Prior Publication Data

US 2024/0412415 A1 Dec. 12, 2024

Related U.S. Application Data

(63) Continuation of application No. PCT/JP2022/043577, filed on Nov. 25, 2022.

(30) Foreign Application Priority Data

Dec. 27, 2021 (JP) ................................ 2021-213136

(51) Int. Cl.
*G06T 7/80* (2017.01)
*B60R 16/02* (2006.01)
(Continued)

(52) U.S. Cl.
CPC ............ *G06T 7/80* (2017.01); *B60R 16/0231* (2013.01); *G01C 21/3811* (2020.08);
(Continued)

(58) Field of Classification Search
CPC ............. G06T 7/80; G06T 2207/30244; G06T 2207/30252; G06T 7/00; G06T 7/70;
(Continued)

(56) References Cited

U.S. PATENT DOCUMENTS

2011/0216201 A1* 9/2011 McAndrew .............. G06T 7/80 348/148
2013/0135474 A1 5/2013 Sakano et al.
(Continued)

FOREIGN PATENT DOCUMENTS

JP 2013115540 A 6/2013
JP 2018147134 A 9/2018
JP 2021140262 A 9/2021

*Primary Examiner* — Sahar Motazedi
(74) *Attorney, Agent, or Firm* — Harness, Dickey & Pierce, P.L.C.

(57) ABSTRACT

An information management system includes a vehicle and a center. The information management system manages information to be provided to an information utilizer from the center. The vehicle obtains external information by using a capture device recognizing a landmark, obtains location information expressing location of the vehicle, and transmits to the center, vehicle information including the external information and the location information. The center receives the vehicle information, obtains calibration information of the capture device by computation using the external information and the location information and a map information database, and records the external information and the location information and the calibration information.

7 Claims, 10 Drawing Sheets

(51) Int. Cl.
*B60R 16/023* (2006.01)
*G01C 21/00* (2006.01)
*G06V 20/58* (2022.01)

(52) U.S. Cl.
CPC .................... *G01C 21/3837* (2020.08); *G06T 2207/30244* (2013.01); *G06T 2207/30252* (2013.01); *G06V 20/58* (2022.01)

(58) Field of Classification Search
CPC ............ B60R 16/0231; G01C 21/3811; G01C 21/3837; G06V 20/58; G06V 20/56; G01S 17/931; G08G 1/096716; G08G 1/096741; G08G 1/0112; G08G 1/0129; G08G 1/0133; G08G 1/0141; G08G 1/09623; G08G 1/096775
See application file for complete search history.

(56) References Cited

U.S. PATENT DOCUMENTS

| | | | | |
|---|---|---|---|---|
| 2015/0222813 | A1* | 8/2015 | Okude | G01C 21/3602 701/523 |
| 2020/0193643 | A1 | 6/2020 | Hess et al. | |
| 2022/0089156 | A1* | 3/2022 | Jeon | B60W 30/12 |
| 2023/0384120 | A1* | 11/2023 | Fan | G06F 16/29 |

* cited by examiner

FIG. 11

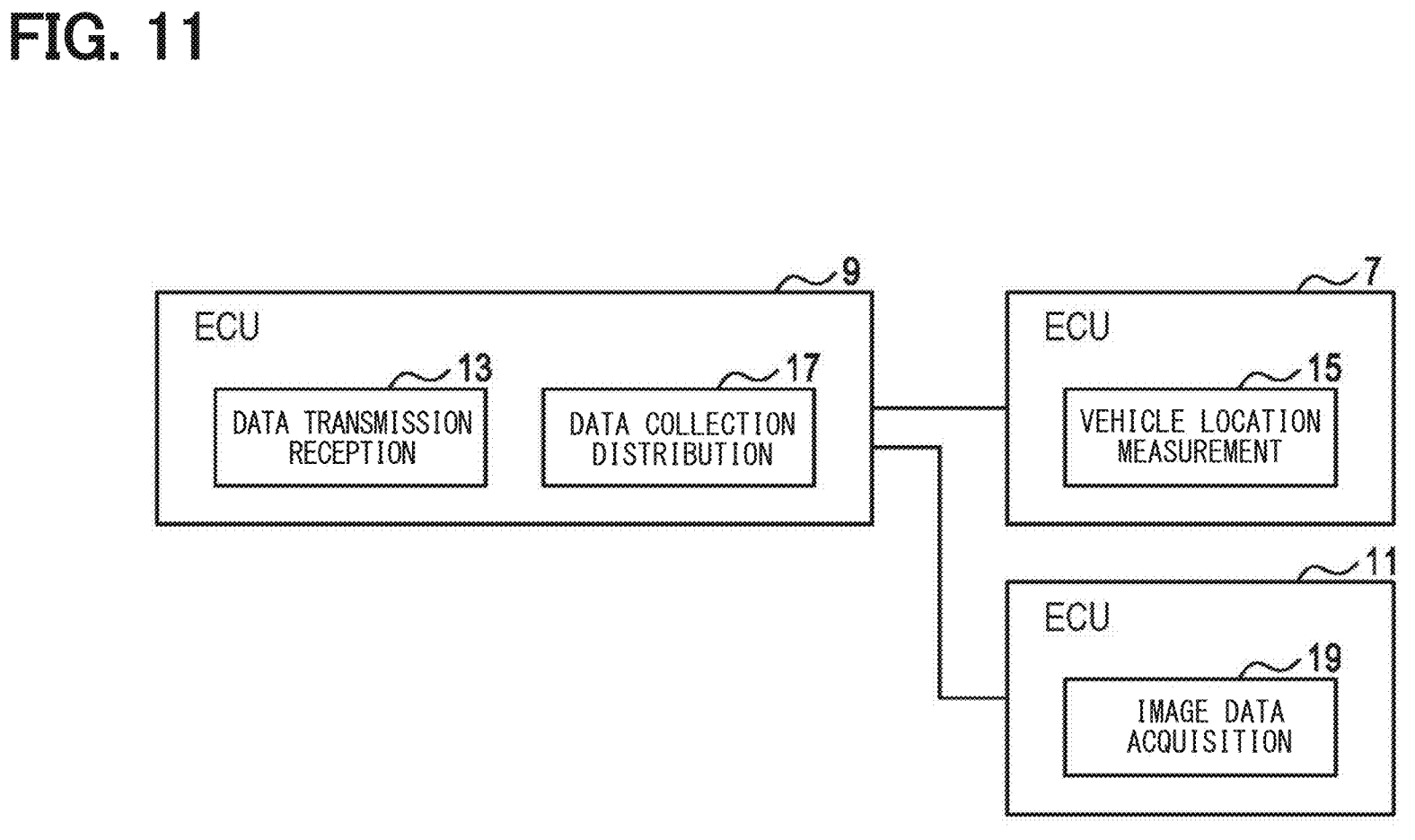

7
ECU
15
VEHICLE LOCATION MEASUREMENT

11
ECU
19
IMAGE DATA ACQUISITION

9
ECU
17
DATA COLLECTION DISTRIBUTION
13
DATA TRANSMISSION RECEPTION

INFORMATION MANAGEMENT SYSTEM, CENTER, INFORMATION MANAGING METHOD, AND STORAGE MEDIUM STORING PROGRAM

CROSS REFERENCE OF RELATED APPLICATIONS

The present application is a continuation application of International Patent Application No. PCT/JP2022/043577 filed on Nov. 25, 2022 which designated the U.S. and claims the benefit of priority from Japanese Patent Application No. 2021-213136 filed on Dec. 27, 2021. The entire disclosures of all of the above applications are incorporated herein by reference.

TECHNICAL FIELD

The present disclosure relates to an information management system, a center, an information managing method, and a program.

BACKGROUND

A related art discloses a camera calibration device. The camera calibration device calibrates an in-vehicle camera using a checker board disposed in a front part of the vehicle as a reference.

Another related art discloses a calibrating method of an in-vehicle camera. In the calibrating method, a known linear structure in an image obtained by an in-vehicle camera is recognized by image recognition, and calibration is performed using a recognized characteristic point as a reference.

SUMMARY

An information management system includes a vehicle and a center. The An information management system manages information to be provided to an information utilizer from the center. The vehicle obtains external information by using a capture device recognizing a landmark, obtains location information expressing location of the vehicle, and transmits to the center, vehicle information including the external information and the location information. The center receives the vehicle information, obtains calibration information of the capture device by computation using the external information and the location information and a map information database, and records the external information and the location information and the calibration information.

BRIEF DESCRIPTION OF DRAWINGS

FIG. 11 is an explanatory diagram illustrating another mode of an ECU of a vehicle.

DETAILED DESCRIPTION

Figure 1:
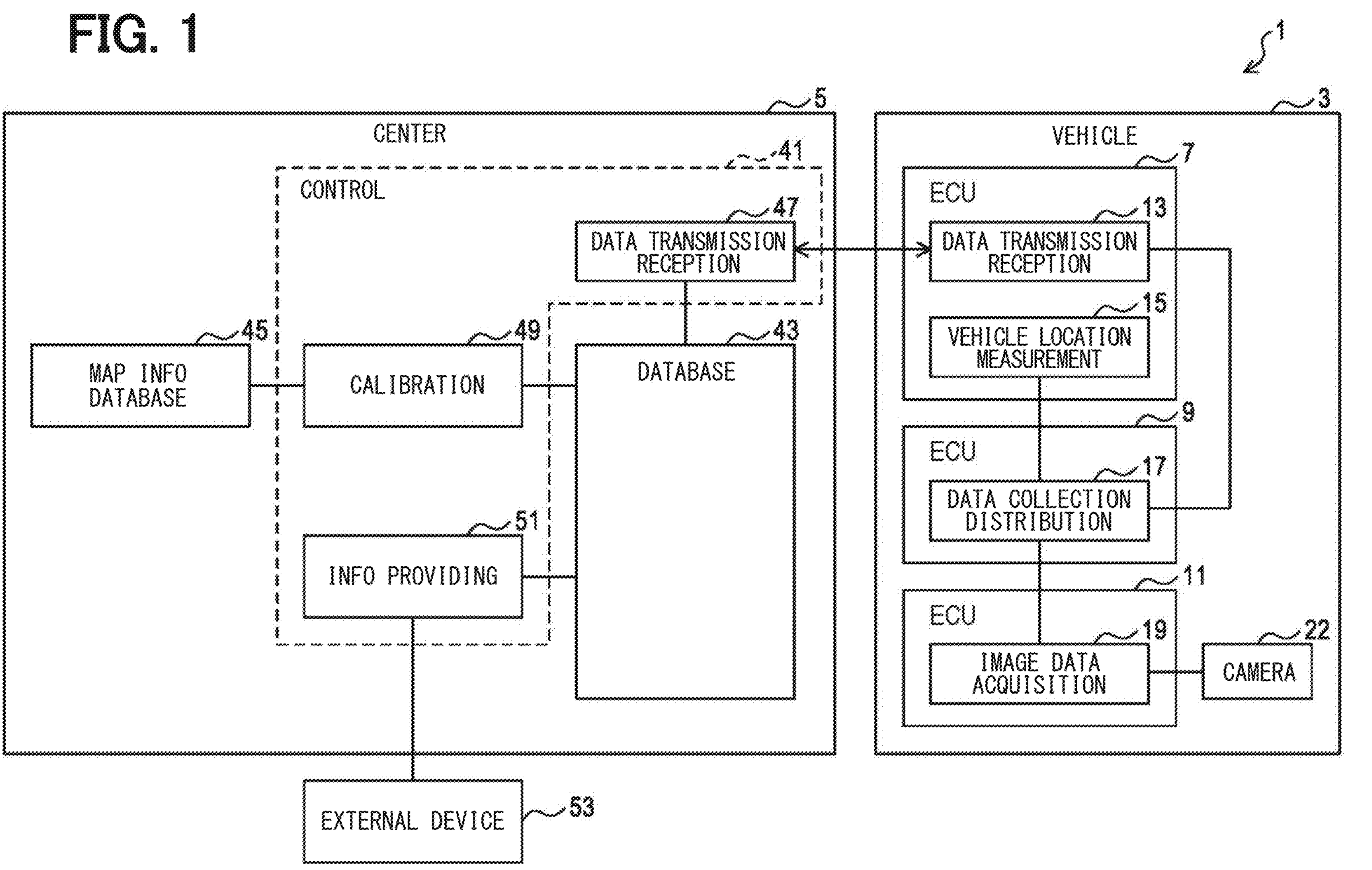
FIG. 1 is a block diagram illustrating the configuration of an information management system.

It is considered to manage information to be provided to an information utilizer by an information management system including a plurality of vehicles and a center. The center collects information from the plurality of vehicles and records the collected information. The center, for example, provides information to an information utilizer. The information to be provided to an information utilizer includes, for example, image information obtained by an in-vehicle camera.

As a result of detailed examination of the inventors, the following problems were found. For an information utilizer, it is preferable to be able to specify a spot in which an image was captured on the basis of provided image information. To specify the spot in which the image was captured on the basis of the image information, location information of a vehicle when the image was captured and information expressing the position and posture of an in-vehicle camera in the vehicle (hereinafter, called calibration information) is necessary.

Acquisition of calibration information by methods described in related arts in each vehicle causes heavy burden on the user of the vehicle. In one aspect of the present disclosure, it is preferable to provide an information management system, a center, an information managing method, and a program capable of recording calibration information even though each vehicle cannot always obtain calibration information.

One aspect of the present disclosure is an information management system that comprises a vehicle and a center and is configured to manage information to be provided to an information utilizer from the center.

The vehicle includes: an external information acquisition unit configured to obtain external information by using a capture device which is provided for the vehicle and capable of recognizing a landmark; a location information acquisition unit configured to obtain location information expressing location of the vehicle; and a vehicle information transmission unit configured to transmit vehicle information including the external information and the location information at a time when the external information is obtained to the center.

The center includes: a vehicle information reception unit configured to receive the vehicle information transmitted from the vehicle information transmission unit; a calibration information acquisition unit configured to obtain calibration information of the capture device by computation using the external information and the location information expressing the landmark, included in the vehicle information received by the vehicle information reception unit and a map information database in which the location of the landmark is recorded; and a recording unit recording the external information and the location information included in the vehicle information received by the vehicle information reception unit, and the calibration information obtained by the calibration information acquisition unit on a basis of the vehicle information.

An information management system as an aspect of the present disclosure can record calibration information even though each vehicle cannot always obtain calibration information.

Another aspect of the present invention relates to a center configured to receive vehicle information transmitted from a vehicle and manage information to be provided to an information utilizer.

The vehicle information includes external information obtained by using a capture device provided for the vehicle and capable of recognizing a landmark, and location information expressing location of the vehicle at the time the external information is obtained.

The center comprises: a vehicle information reception unit configured to receive the vehicle information transmitted from the vehicle; a calibration information acquisition unit configured to obtain calibration information of the capture device by computation using the external information and the location information expressing the landmark, included in the vehicle information received by the vehicle information reception unit and a map information database in which the location of the landmark is recorded; and a recording unit recording the external information and the location information included in the vehicle information received by the vehicle information reception unit, and the calibration information obtained by the calibration information acquisition unit on the basis of the vehicle information.

According to the center as another aspect of the present disclosure, even though calibration information cannot be always obtained in each vehicle, calibration information can be recorded.

Further another aspect of the present disclosure relates to an information managing method of collecting vehicle information from a vehicle and managing information to be provided to an information utilizer.

The vehicle information includes external information obtained by using a capture device provided for the vehicle and capable of recognizing a landmark, and location information expressing location of the vehicle at the time the external information is obtained. Calibration information of the capture device is obtained by computation using the external information and the location information expressing the landmark included in the collected vehicle information and a map information database in which the location of the landmark is recorded, and the external information and the location information included in the collected vehicle information, and the calibration information obtained on the basis of the vehicle information are recorded in a recording unit.

According to the information managing method as another aspect of the present disclosure, even though calibration information cannot be always obtained in each vehicle, calibration information can be recorded.

Illustrative embodiments of the present disclosure will be described with reference to the drawings.

First Embodiment

1. Configuration of Information Management System 1

The configuration of an information management system 1 will be described on the basis of FIGS. 1 to 5. As illustrated in FIG. 1, the information management system 1 includes a vehicle 3 and a center 5. The number of vehicles 3 may be one or plural.

The vehicle 3 has ECUs 7, 9 and 11. The ECU 7 functions as a data transmission and reception unit 13 and a subject vehicle location measurement unit 15. The data transmission and reception unit 13 transmits/receives information to/from the center 5. Information transmitted to the center 5 includes vehicle information 29 and calibration information 25 which will be described later. Information transmitted to the center 5 includes the calibration information 25 and the like. The data transmission and reception unit 13 corresponds to a vehicle information transmission unit and a calibration information reception unit. The subject vehicle location measurement unit 15 corresponds to a location information acquisition unit.

The subject vehicle location measurement unit 15 obtains the location information 27. The location information 27 is information expressing the location of the vehicle 3 when an image data acquisition unit 19 which will be described later obtains image information 23. The subject vehicle location measurement unit 15 obtains the location information 27, for example, by using a GNSS (Global Navigation Satellite System).

Each of the functions of the ECU 7 is realized when the ECU 7 executes a program stored in a non-transitory tangible recording medium. By executing the program, a method corresponding to the program is executed. The ECU 7 may have one microcomputer or a plurality of microcomputers.

The ECU 9 functions as a data transmission and reception unit 17. The data collection and distribution unit 17 collects data constructing the vehicle information 29 and generates the vehicle information 29. The data collection and distribution unit 17 distributes the vehicle information 29 to the data transmission and reception unit 13.

Figure 3:
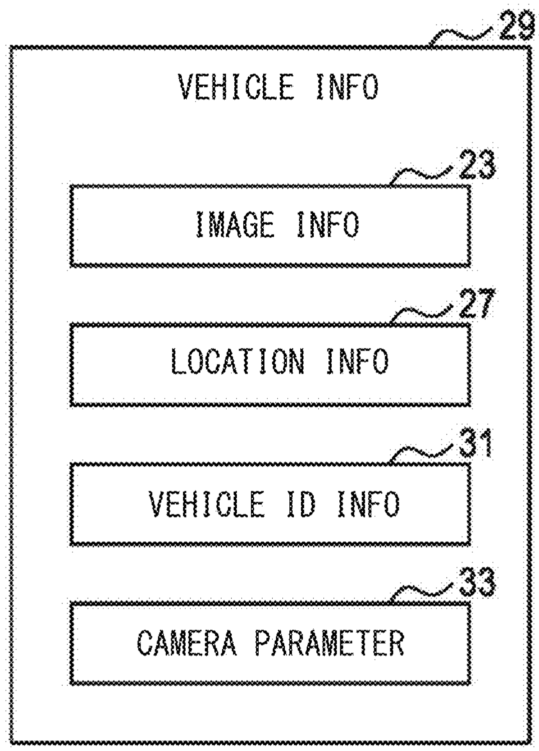
FIG. 3 is an explanatory diagram illustrating the configuration of vehicle information.

As illustrated in FIG. 3, the vehicle information 29 includes the image information 23, the location information 27, vehicle identification information 31, and a camera parameter 33. The camera parameter 33 is information expressing a parameter of a camera 22. The content of the camera parameter 33 includes, for example, fx, fy, cx, and cy which will be described later.

The vehicle identification information 31 is information used to identify the vehicle 3. The vehicle identification information 31 is, for example, information including the content such as VIN (vehicle identification number) of the vehicle 3, the manufacturer of the vehicle 3, the model name of the vehicle 3, the manufacture year of the vehicle 3, and equipment components of the vehicle 3.

The vehicle information 29 may include other information. The other information is, for example, a vehicle signal, sensor data generated by a sensor other than the camera 22, and the like. The vehicle signals are, for example, signals indicating speed of the vehicle 3, the states of the doors, and the like. A sensor other than the camera 22 is, for example, a lidar and the like.

The functions of the ECU 9 are realized when the ECU 9 executes the program stored in the non-transitory tangible recording medium. By executing the program, a method corresponding to the program is executed. The ECU 9 may have one microcomputer or a plurality of microcomputers.

Figure 5:
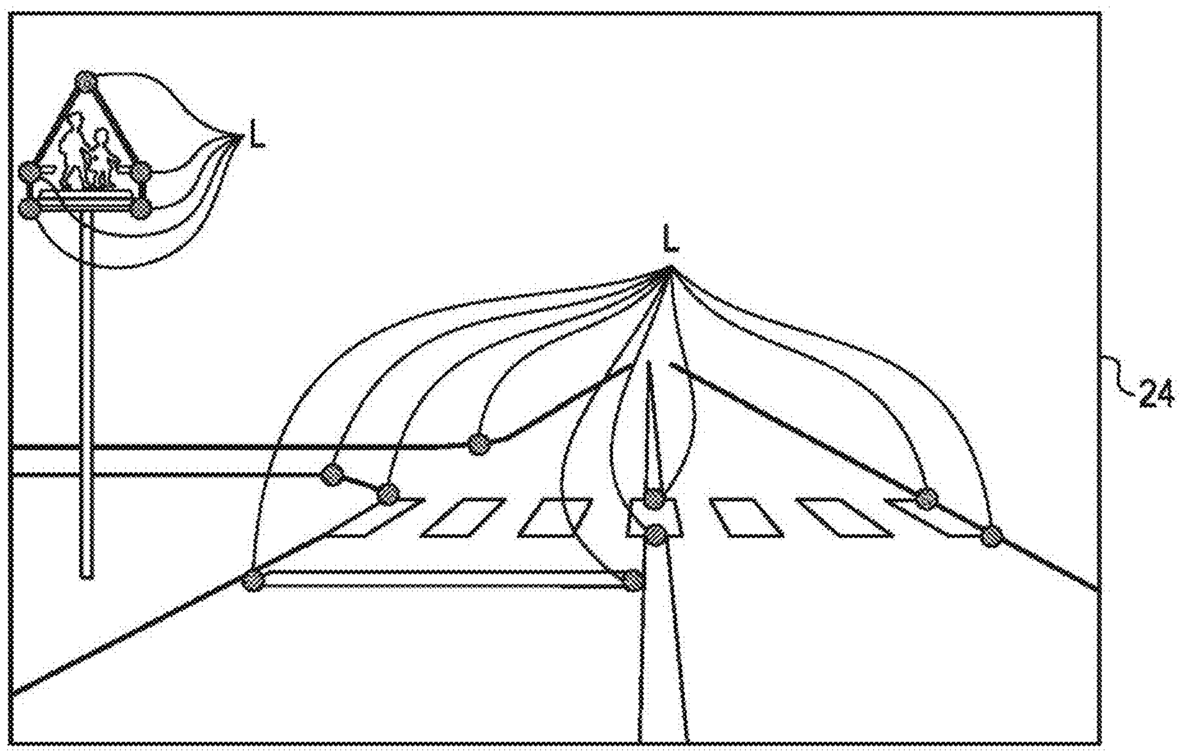
FIG. 5 is an explanatory diagram illustrating the content of image information.

The ECU 11 functions as the image data acquisition unit 19. The image data acquisition unit 19 obtains the image information 23 by using the camera 22 provided for the vehicle 3. The image information 23 is information expressing an image 24 obtained by shooting the surrounding of the vehicle 3. The image 24 is, as illustrated in FIG. 5, an image expressing landmarks L. Examples of the landmarks L are a sign, a while line, and the like.

The camera 22 is, for example, a camera provided for an advanced drive system, a camera for data collection, or a camera of a drive recorder. The image data acquisition unit 19 corresponds to an external information acquisition unit.

The camera 22 corresponds to a capture device. The capture device is a device capable of recognizing the landmark L. The capture device is not limited to the camera 22 but may be a lidar or the like. A lidar is a sensor capturing a radar signal.

The image information 23 corresponds to the external information. The external information is information by which the landmark L can be recognized. The external information is not limited to the image information 23 but is information obtained by performing an object recognizing process on an output of the capture device (hereinafter, called object recognition information). Examples of the object recognition information include information obtained by performing the object recognizing process on the image information 23 and information obtained by performing the object recognizing process on an output of the lidar.

Each of the functions of the ECU 11 is realized when the ECU 11 executes a program stored in a non-transitory tangible recording medium. By executing the program, a method corresponding to the program is executed. The ECU 11 may have one microcomputer or a plurality of microcomputers.

The center 5 has a control unit 41, a database 43 and a map information database 45. The control unit 41 functions as a data transmission and reception unit 47, a calibration unit 49, and an information providing unit 51. The center 5 and an external device 53 which will be described later are, for example, a part of a cloud computer. The database 43 corresponds to a recording unit.

The data transmission and reception unit 47 transmits/receives information to/from the vehicle 3. Information transmitted to the vehicle 3 includes the calibration information 25 and the like. Information received from the vehicle 3 includes the vehicle information 29, the calibration information 25 and the like. The data transmission and reception unit 47 corresponds to a vehicle information reception unit and a calibration information transmission unit.

The calibration unit 49 obtains the calibration information 25. A method of obtaining the calibration information 25 will be described later. The calibration unit 49 and the map information database 45 corresponds to a calibration information acquisition unit.

The information providing unit 51 transmits at least a part of information recorded in the database 43 to the external device 53. The information transmitted to the external device 53 will be called information to be provided hereinafter. The information to be provided includes the image information 23 and the location information 27 included in the vehicle information 29 and the calibration information 25 associated with the vehicle information 29. The information to be provided further includes, for example, time information expressing time when the image information 23 is obtained. The location information 27 included in the information to be provided is, for example, location information indicating the location within an area designated by an information utilizer. The information providing unit 51 corresponds to an information providing unit.

The external device 53 is a device which can be used by an information utilizer. Transmission of the information to be provided to the external device 53 corresponds to provision of information to an information utilizer. Examples of the information utilizer include an OEM maker, an information utilizer as a third party, and an individual information utilizer. The information utilizer as a third party can provide information, for example, to an application user.

The information utilizer can utilize the information to be provided, for example, for analysis of a travel path or the like. By analyzing a travel path, for example, a path search algorithm of navigation guide or home-delivery service can be improved.

The information utilizer can utilize provided information for, for example, creation of a high-precision map, monitoring of road conditions, service related to an insurance, display of a street map, distribution of a travel video, and the like. A high-precision map is, for example, a map in which information such as signs and white lines are recorded with high precision. A high-precision map can be used, for example, for automatic driving.

Examples of road conditions include traffic congestion, road construction, and the existence of a fallen object. As utilization in service related to an insurance, for example, it can be considered to clarify vehicle behaviors and the like before and after an accident on the basis of provided information and use them as an evidence of rating blame. In a street map, for example, a map and an image superimposed on the map are displayed. Travel video distribution can be provided, for example, as record of a travel destination or the like to a general user.

Figure 2:
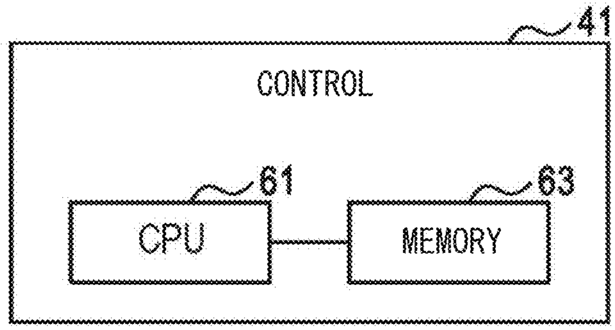
FIG. 2 is a block diagram illustrating the configuration of a control unit.

As illustrated in FIG. 2, the control unit 41 has a microcomputer including a CPU 61 and, for example, a semiconductor memory such as a RAM or ROM (hereinafter, called a memory 63).

Each of the functions of the control unit 41 is realized when the CPU 61 executes a program stored in a non-transitory tangible recording medium. In this example, the memory 63 corresponds to a non-transitory tangible recording medium storing a program. By executing the program, a method corresponding to the program is executed. The control unit 41 may have one microcomputer or a plurality of microcomputers.

Figure 4:
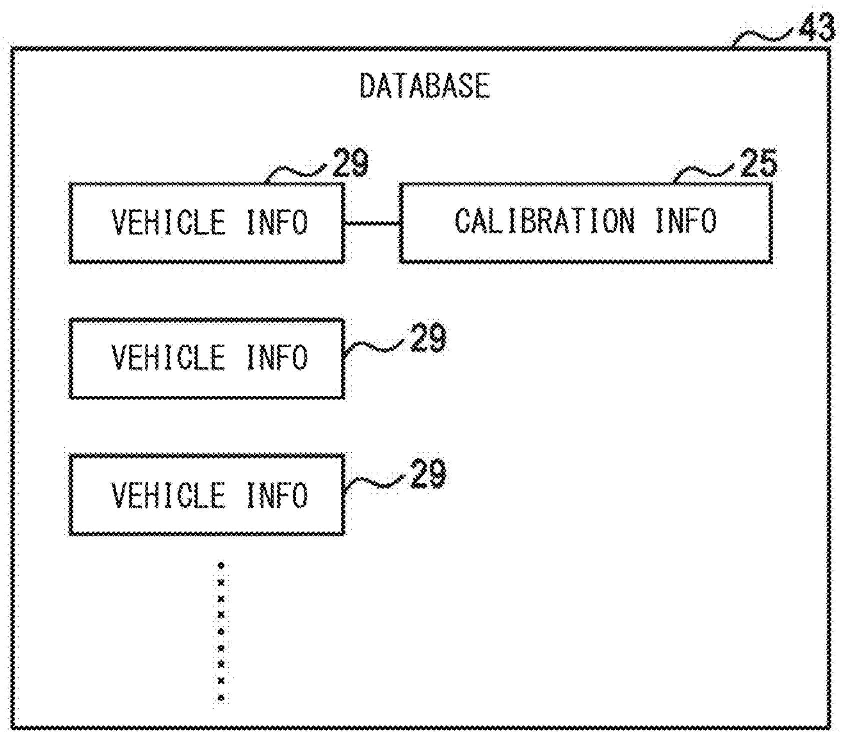
FIG. 4 is an explanatory diagram illustrating information recorded in a database.

In the database 43, information can be recorded. As illustrated in FIG. 4, the vehicle information 29 can be recorded in the database 43. In the database 43, the calibration information 25 can be also recorded so as to be associated with the vehicle information 29.

In the map information database 45, the characteristic of the landmark L and absolute coordinates of the landmark L are recorded so as to be associated. The absolute coordinates are coordinates expressed by coordinate axes fixed to the earth. As the absolute coordinates, for example, there are coordinates expressed by latitude, longitude, and altitude.

2. Processes Executed by Vehicle 3 and Center 5

(2-1) Vehicle Information Transmitting Process

Figure 6:
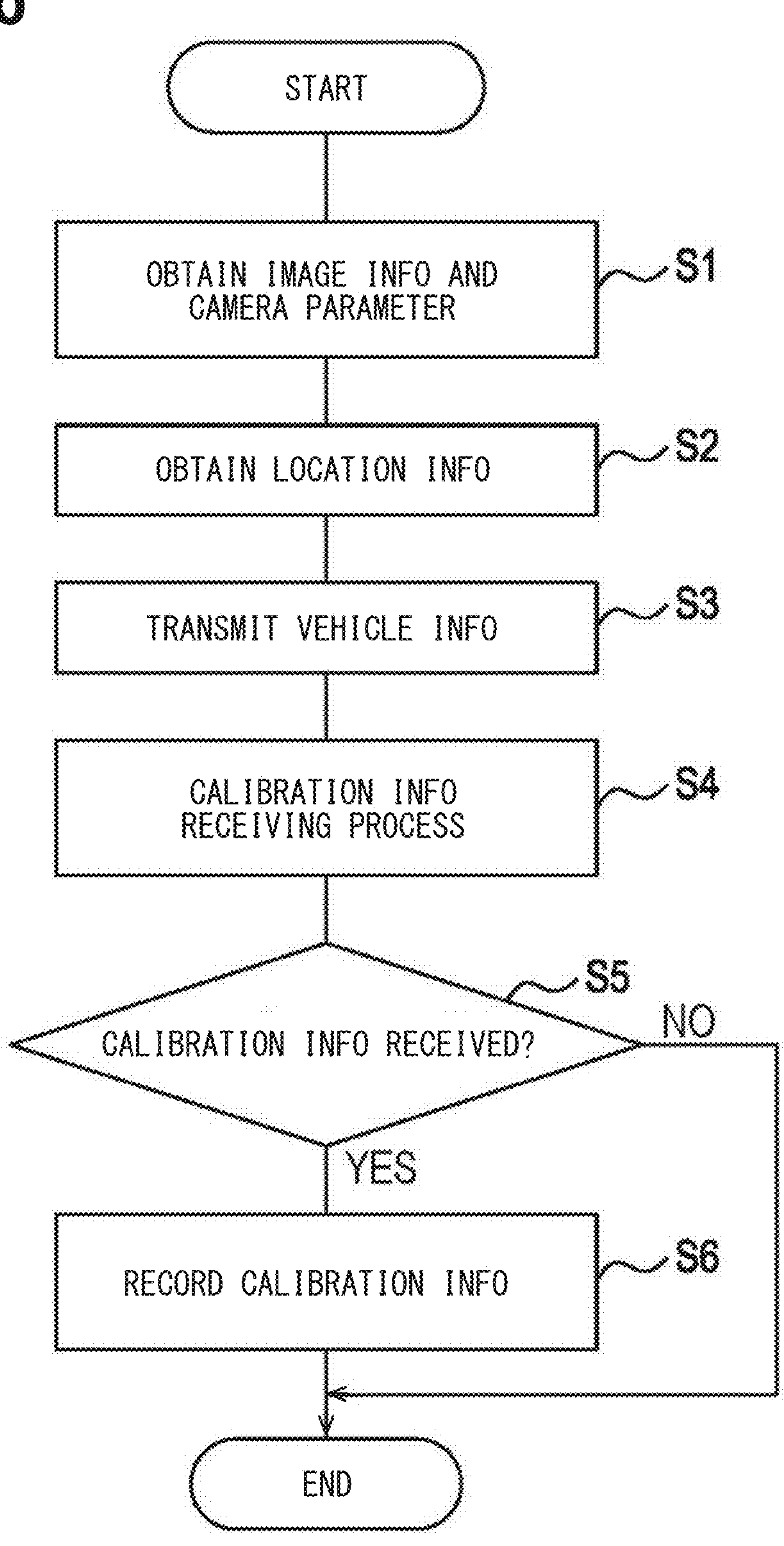
FIG. 6 is a flowchart illustrating vehicle information transmitting process.

A vehicle information transmitting process executed by the vehicle 3 will be described on the basis of FIG. 6. The vehicle 3 repeatedly executes the vehicle information transmitting process, for example, every predetermined time. Alternatively, the vehicle 3 executes the vehicle information transmitting process on request from the center 5. For example, when provision of information is requested from an information utilizer, the center 5 requests the vehicle 3 to execute the vehicle information transmitting process.

For example, an information utilizer requests the center 5 to provide the vehicle information 29 including the image information 23 obtained in a predetermined area. In this case, the center 5 requests the vehicle 3 travelling in the area to execute the vehicle information transmitting process.

In step 1, the image data acquisition unit 19 obtains the image information 23. The data collection and distribution unit 17 obtains the camera parameter 33.

In step 2, the subject vehicle location measurement unit 15 obtains the location information 27. The location information 27 is information expressing the location of the vehicle 3 when it obtains the image information 23 in the step 1.

In step 3, the data collection and distribution unit 17 collects the image information 23, the location information 27, the camera parameter 33, and the vehicle identification information 31 and generates the vehicle information 29. The vehicle identification information 31 is recorded in the vehicle 3 in advance. The data collection and distribution unit 17 distributes the vehicle information 29 to the data transmission and reception unit 13.

Subsequently, the data transmission and reception unit 13 transmits the vehicle information 29 to the center 5. In the case where the calibration information 25 is recorded in the vehicle 3 by the process in step 6 which will be described later and was executed in the past, the data transmission and reception unit 13 transmits the calibration information 25 as well to the center 5.

In step 4, the data transmission and reception unit 13 executes the process of receiving the calibration information 25. The calibration information 25 to be received is transmitted from the center 5 as will be described later.

In step 5, whether or not the calibration information 25 is received in the step 4 is determined by the data transmission and reception unit 13. When it is determined that the calibration information 25 is received, the process advances to step 6. When it is determined that the calibration information 25 is not received, the process is finished.

In the step 6, the data collection and distribution unit 17 records the calibration information 25 received.

(2-2) Vehicle Information Recording Process

Figure 7:
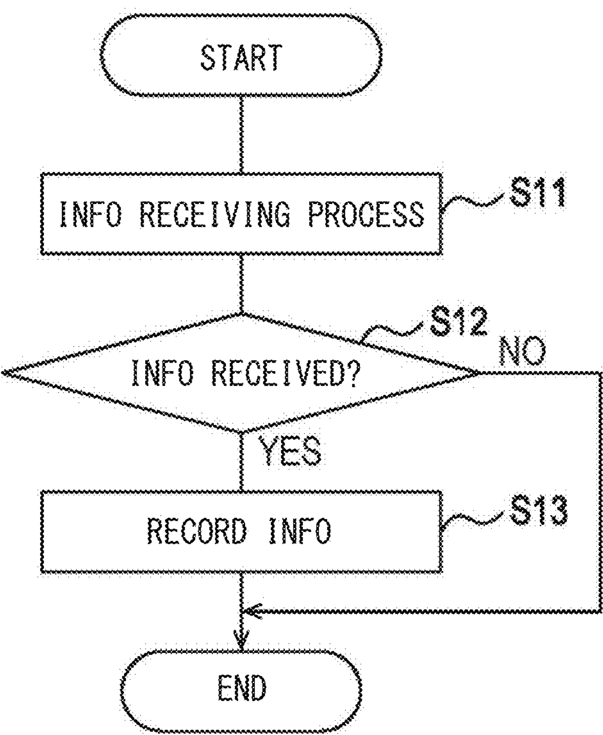
FIG. 7 is a flowchart illustrating vehicle information recording process.

The vehicle information recording process repeated every predetermined time by the center 5 will be described on the basis of FIG. 7. In step 11, the data transmission and reception unit 47 executes an information receiving process. The information receiving process is a process of receiving information transmitted from the vehicle 3. The information transmitted from the vehicle 3 is the vehicle information 29 and the calibration information 25.

In step 12, whether or not information is received in the step 11 is determined by the data transmission and reception unit 47. When it is determined that information is received, the process advances to step 13. When it is determined that information is not received, the process is finished.

In the step 13, the data transmission and reception unit 47 records the received information in the database 43. As a result, as illustrated in FIG. 4, the vehicle information 29 is recorded in the database 43. In the case where the calibration information 25 is also received, the calibration information 25 is also recorded in the database 43. The calibration information 25 is recorded in association with the vehicle information 29 received at the same time.

The reception and recording of the vehicle information 29 or the calibration information 25 by the center 5 corresponds to collection of information from the vehicle 3.

(2-3) Calibration Information Obtaining Process

Figure 8:
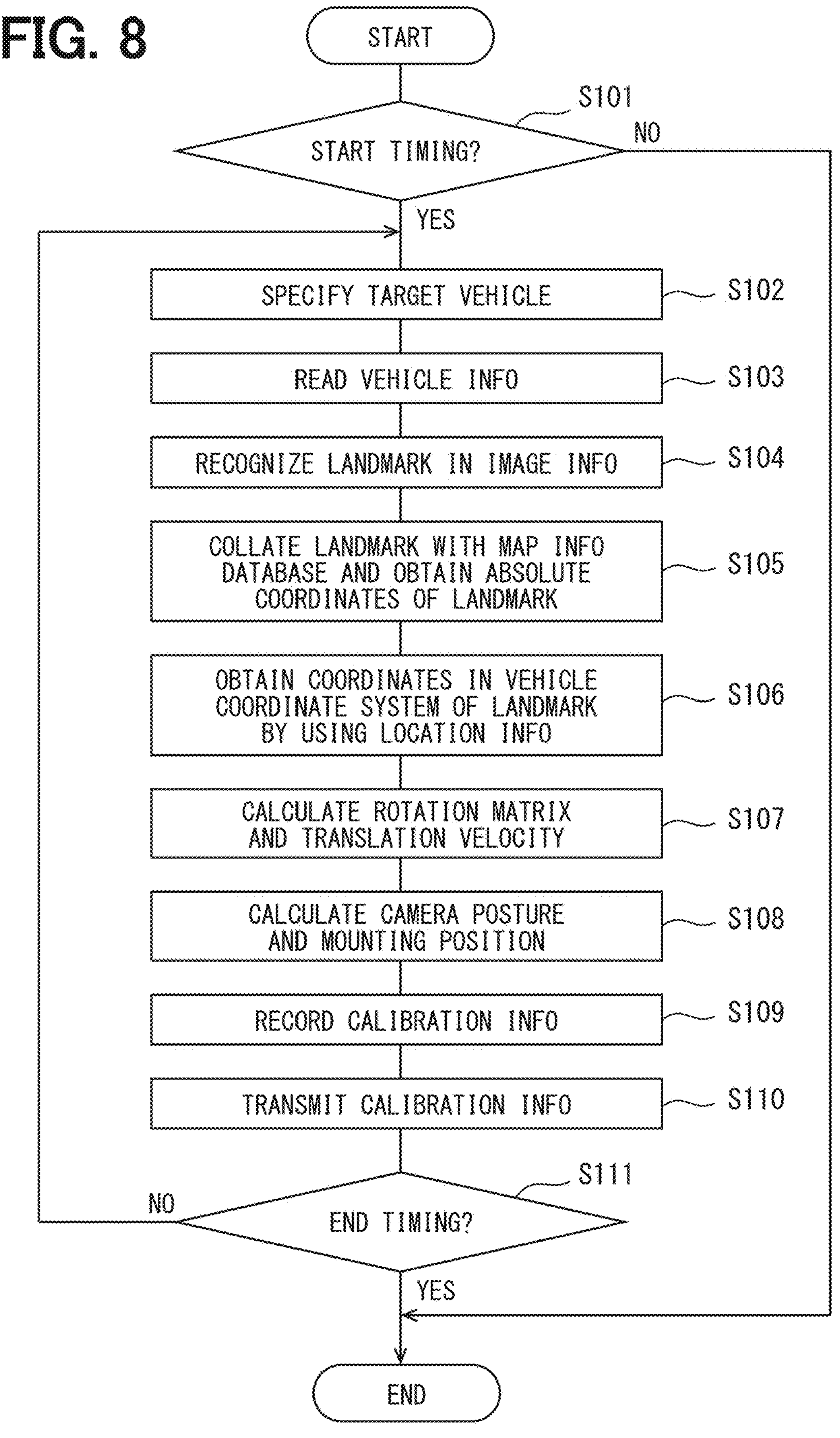
FIG. 8 is a flowchart illustrating calibration information obtaining process.

A calibration information obtaining process repeatedly executed by the calibration unit 49 and the data transmission and reception unit 47 every predetermined time will be described on the basis of FIGS. 8 to 10.

In step 101 in FIG. 8, the calibration unit 49 determines whether or not the present time point is a timing the calibration information obtaining process is to be started (hereinafter, called start timing). For example, when the resources of the control unit 41 are not insufficient, it corresponds to the start timing. When an information utilizer requests provision of information, it corresponds to the start timing. In the case where it is determined that the present time point is the start timing, the process advances to step 102. When it is determined that the present time point is not the start timing, the process is finished. The processes in steps 102 to 108 correspond to computation.

In the step 102, the calibration unit 49 specifies the vehicle 3 as an object of the calibration information obtaining process (hereinafter, called a target vehicle). The target vehicle is the vehicle 3 in which calibration information 25 is not generated yet among the vehicles 3 whose vehicle information 29 has been sent to the center 5 in the past.

The calibration unit 49 finds the vehicle information 29 with which the calibration information 25 is not associated from the vehicle information 25 recorded in the database 43. The calibration unit 49 determines the target vehicle on the basis of the vehicle identification information 31 included in the vehicle information 29 found.

For example, an information utilizer requests the center 5 to provide the vehicle information 29 satisfying a predetermined condition. An example of the condition is a condition that the image information 23 obtained in a predetermined area is included. In this case, the calibration unit 49 sets, as the target vehicle, the vehicle 3 in which the calibration information 25 has not been created yet and the vehicle 3 as a source of transmission of the vehicle information 29 satisfying the condition.

In the step 103, the calibration unit 49 reads the vehicle information 29 transmitted from the target vehicle from the database 43 on the basis of the vehicle identification information 31 of the target vehicle. The vehicle information 29 to be read is the vehicle information 29 received in the step 11 and recorded in the database 43 in the step 13.

In the step 104, the calibration unit 49 recognizes the landmarks L1, L2 and L3 by the image recognizing process in the image information 23 included in the vehicle information 29 read in the step 103. The calibration unit 49 obtains the coordinates of the landmarks L1, L2, and L3 in an image coordinate system.

Figure 9:
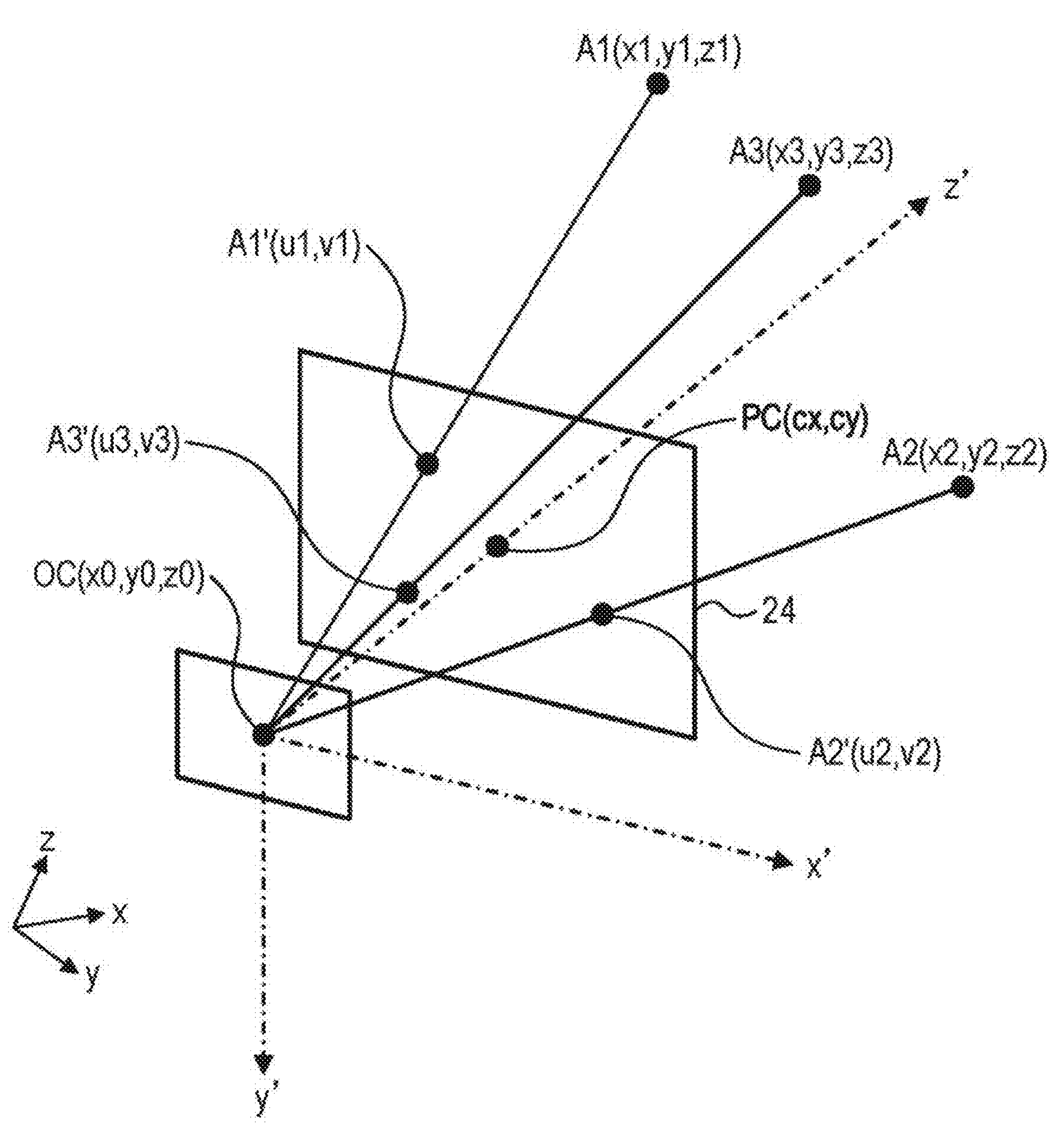
FIG. 9 is an explanatory diagram illustrating a method of obtaining calibration information.
Figure 10:
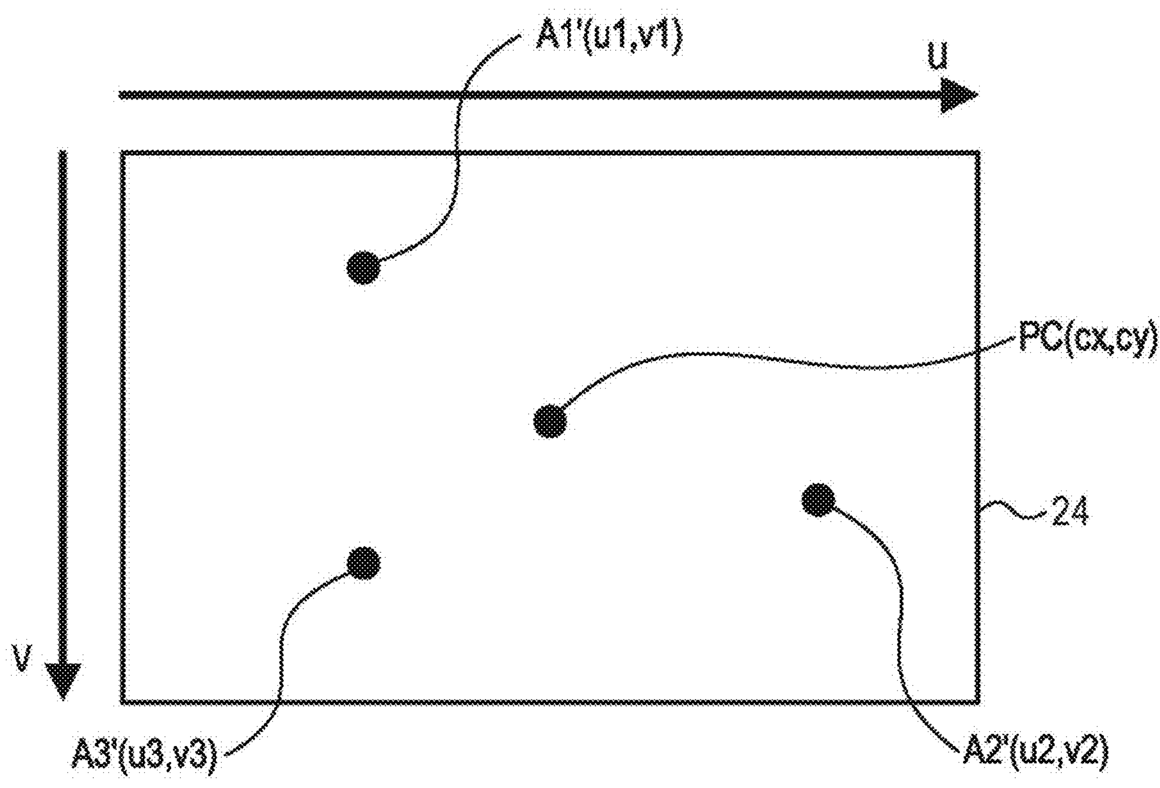
FIG. 10 is an explanatory diagram illustrating locations of landmarks in an image coordinate system.

The image coordinate system is a coordinate system expressing a position in the image 24 indicated by the image information 23 as illustrated in FIGS. 9 and 10. The image coordinate system is a coordinate system whose coordinates are specified by the u axis and the v axis. The u axis and the v axis are coordinate axes in the plane of the image 24. The coordinates of the landmarks L1, L2, and L3 in the image coordinate system are coordinates of the landmarks L1, L2, and L3 each formed in a focal plane of the camera 22. As illustrated in FIGS. 9 and 10, the coordinates of the landmarks L1, L2, and L3 in the image coordinate system are set as A1'(u1, v1), A2'(u2, v2), and A3'(u3, v3), respectively. u1, u2, and u3 are coordinates in the u axis. v1, v2, and v3 are coordinates in the v axis.

In the step 105, the calibration unit 49 collates the landmarks L1, L2, and L3 with the map information database 45 and obtains the absolute coordinates of the landmarks L1, L2, and L3.

In step 106, the calibration unit 49 uses the location information 27 included in the vehicle information 29 read in the step 103 and the absolute coordinates of the landmarks L1, L2, and L3 obtained in the step 105 to obtain the coordinates of the landmarks L1, L2, and L3 in a vehicle coordinate system.

The vehicle coordinate system is a coordinate system using a target vehicle as a reference. As illustrated in FIG. 9, the vehicle coordinate system is a coordinate system in which coordinates are specified by the x axis, y axis, and z axis. The x axis is a coordinate axis in the lateral direction of the target vehicle. The y axis is a coordinate axis in the vertical direction of the target vehicle. The z axis is a coordinate axis in the longitudinal direction of the target vehicle.

As illustrated in FIG. 9, the coordinates of the landmarks L1, L2, and L3 in the vehicle coordinate system are set as A1 (x1, y1, z1), A2 (x2, y2, z2), and A3 (x3, y3, z3), respectively. x1, x2, and x3 are coordinates in the x axis. y1, y2, and y3 are coordinates in the y axis. z1, z2, and z3 are coordinates in the z axis.

In the step 107, the calibration unit 49 obtains T satisfying mathematical formulae 1 to 3.

$$\begin{bmatrix} u1 \\ v1 \\ 1 \end{bmatrix} = \begin{bmatrix} f_x & 0 & c_x \\ 0 & f_y & c_y \\ 0 & 0 & 1 \end{bmatrix} T \begin{bmatrix} X1 \\ Y1 \\ Z1 \\ 1 \end{bmatrix} \quad \text{(Formula 1)}$$

$$\begin{bmatrix} u2 \\ v2 \\ 1 \end{bmatrix} = \begin{bmatrix} f_x & 0 & c_x \\ 0 & f_y & c_y \\ 0 & 0 & 1 \end{bmatrix} T \begin{bmatrix} X2 \\ Y2 \\ Z2 \\ 1 \end{bmatrix} \quad \text{(Formula 2)}$$

$$\begin{bmatrix} u3 \\ v3 \\ 1 \end{bmatrix} = \begin{bmatrix} f_x & 0 & c_x \\ 0 & f_y & c_y \\ 0 & 0 & 1 \end{bmatrix} T \begin{bmatrix} X3 \\ Y3 \\ Z3 \\ 1 \end{bmatrix} \quad \text{(Formula 3)}$$

(Formula 4)

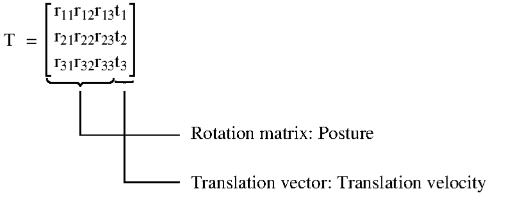

As illustrated in mathematical formula 4, T denotes a rotation matrix and a translation vector. A rotation matrix corresponds to the posture of the camera 22. A translation vector corresponds translation velocity of the camera 22.

In the mathematical formulae 1 to 3, fx and fy denote focal distances of camera coordinates. As illustrated in FIGS. 9 and 10, cx and cy are coordinates of an image center PC in the image coordinate system. cx is a coordinate in the u axis. cy is a coordinate in the v axis. The image center PC lies within the plane of the image 24. fx, fy, cx, and cy are the camera parameters 33. fx, fy, cx, and cy are included in the vehicle information 29 read in the step 103.

In the step 108, the calibration unit 49 obtains coordinates (x0, y0, z0) of an optical center OC in the vehicle coordinate system and angles θ, φ, and ψ satisfying mathematical formulae 5 to 11.

$$u1 = fx*(x1-x0)/(z1-z0)+cx \quad \text{(Formula 5)}$$

$$v1 = fy*(y1-y0)/(z1-z0)+cy \quad \text{(Formula 6)}$$

$$u2 = fx*(x2-x0)/(z2-z0)+cx \quad \text{(Formula 7)}$$

$$v2 = fy*(y2-y0)/(z2-z0)+cy \quad \text{(Formula 8)}$$

$$u3 = fx*(x3-x0)/(z3-z0)+cx \quad \text{(Formula 9)}$$

$$v3 = fy*(y3-y0)/(z3-z0)+cy \quad \text{(Formula 10)}$$

$$\cos\Theta = \{(1,0,0)\cdot(X-x0,\ Y-y0,\ Z-z0)\}/\sqrt{\{(X-x0)^\wedge 2+(Y-y0)^\wedge 2+(Z-z0)^\wedge 2\}} \quad \text{(Formula 11)}$$

$$\cos\varphi = \{(0,1,0)\cdot(X-x0,\ Y-y0,\ Z-z0)\}/\sqrt{\{(X-x0)^\wedge 2+(Y-y0)^\wedge 2+(Z-z0)^\wedge 2\}} \quad \text{(Formula 12)}$$

$$\Psi = \arctan\{(u1-cx)/(v1-cy)\} - \arctan\{(y1-Y)/(x1-X)\} \quad \text{(Formula 13)}$$

$$\Psi = \arctan\{(u2-cx)/(v2-cy)\} - \arctan\{(y2-Y)/(x2-X)\} \quad \text{(Formula 14)}$$

$$\Psi = \arctan\{(u3-cx)/(v3-cy)\} - \arctan\{(y3-Y)/(x3-X)\} \quad \text{(Formula 15)}$$

The optical center OC corresponds to the mounting position of the camera 22 in the target vehicle.

The angle θ is the angle formed by the y axis and the y' axis. The angle φ is the angle formed by the z axis and the z' axis. The angle ψ is the angle formed by the x axis and the x' axis. The x' axis, the y' axis, and the z' axis are coordinate axes in the coordinate system using the camera 22 as a reference. The z' axis is a coordinate axis in the optical axis direction of the camera 22. The angles θ, φ, and ψ express the posture of the camera 22 using the target vehicle as a reference.

In the step 109, the calibration unit 49 records the calibration information 25 so as to be associated with the vehicle information 29 received from the target vehicle in the database 43. The calibration information 25 to be recorded is information including the rotation matrix and the translation velocity calculated in the step 107 and the mounting position and the posture of the camera 22 calculated in the step 108.

The calibration information 25 may be information expressing either the mounting position or the posture of the camera 22. The method of calculating the calibration information 25 may be a method other than the above-mentioned method. Recording of the calibration information 25 corresponds to management of information to be provided to an information utilizer.

In the step 110, the data transmission and reception unit 47 transmits the calibration information 25 to the target vehicle. The target vehicle receives the transmitted calibration information 25 in the step 4.

In the step 111, the calibration unit 49 determines whether or not the present time point is the timing to finish the calibration information obtaining process (hereinafter, end timing). For example, when the resources of the control unit 41 are insufficient, it corresponds to the end timing. When creation of the calibration information 25 has been finished for all of target vehicles, it corresponds to the end timing. When it is determined that the present time point is the end timing, the process is finished. In the case where it is determined that the present time point is not the end timing, the process advances to the step 102.

(2-4) Vehicle Information Providing Process

On request from an information utilizer, the information providing unit 51 reads providing information from the database 43 and transmits the providing information to the external device 53.

(1A) Even when the calibration information 25 cannot be obtained in each vehicle 3, the information management system 1 can record the calibration information 25 and provide it to an information utilizer.

(1B) The center 5 transmits the calibration information 25 to the vehicle 3 as a transmission source of the vehicle information 29 used to obtain the calibration information 25. The vehicle 3 receives the calibration information 25 transmitted. After receiving the calibration information 25, the vehicle 3 transmits the calibration information 25 in addition to the vehicle information 29 to the center 5.

When the calibration information 25 is received from the vehicle 3, the center 5 may not execute the calibration information obtaining process with respect to the vehicle 3. Consequently, the process burden on the center 5 can be lessened.

(1C) For example, whether or not the resources of the control unit 41 are insufficient is determined and when it is determined that the resources are not insufficient, the center 5 obtains the calibration information 25. Consequently, insufficiency of the resources of the control unit 41 caused by acquisition of the calibration information 25 can be suppressed.

(1 D) For example, when provision of the vehicle information 29 is requested from an information utilizer, the center 5 obtains the calibration information 25. Consequently, the resources of a computer functioning as the calibration unit 49 can be effectively used.

(1 E) The vehicle 3 has ECUs 7, 9 and 11. The ECU 11 is connected to the camera 22. The ECU 11 functions as the image data acquisition unit 19. The ECU 7 functions as the data transmission and reception unit 13 and the subject vehicle location measurement unit 15. The data transmission and reception unit 13 is, for example, a communication device communicating with the center 5. The ECU 9 functions as the data transmission and reception unit 17. The ECU 9 has a relaying function of an in-vehicle network of the vehicle 3. The ECU 9 collects the image information 23 and the location information 27. In this case, it is easy to configure the vehicle 3 by using the camera 22 of an advanced driving system. The ECU 11 corresponds to a first ECU, the ECU 7 corresponds to a second ECU, and the ECU 9 corresponds to a third ECU.

Second Embodiment

1. Points Different from First Embodiment

Since the basic configuration of a second embodiment is similar to that of the first embodiment, the different points will be described. The same reference numerals as those of the first embodiment have the same configurations, so that the foregoing description is to be referred to.

In the above-described first embodiment, the external information is the image information 23. The second embodiment is different from the first embodiment with respect to the point that the external information is object recognition information obtained by performing object recognizing process on the image information 23. This different point will be described concretely.

In step 1, the image data acquisition unit 19 performs the object recognizing process on the image information 23 to obtain object recognition information. In the object recognizing process, the landmarks L1, L2, and L3 are recognized. The object recognition information includes the coordinates of the landmarks L1, L2, and L3. The object recognition information corresponds to the external information.

The vehicle information 29 generated in the step 3 and transmitted to the center 5 includes the object recognition information obtained in the step 1, the location information 27, the parameters of the camera 22, and the vehicle identification information 31.

After the calibration unit 49 reads the vehicle information 29 in step 103, the process skips step 104 and advances to processes in step 105 and subsequent steps. Since the vehicle information 29 includes the coordinates of the landmarks L1, L2, and L3, the process of the step 104 (that is, the process of performing the image recognizing process on the image information 23, recognizing the landmarks L1, L2, and L3, and obtaining the coordinates of the landmarks L1, L2, and L3) is unnecessary.

According to the second embodiment specifically described above, in addition to the effects of the first embodiment, the following effects are produced.

(2A) The vehicle 3 performs the object recognizing process on the image information 23 to generate object recognition information. The object recognition information includes the coordinates of the landmarks L1, L2, and L3. The vehicle 3 transmits the vehicle information 29 including the object recognition information to the center 5.

Since the vehicle information 29 received by the center 5 includes the coordinates of the landmarks L1, L2, and L3, the center 5 does not have to perform the process of the step 104. As a result, the process burden on the center 5 can be lessened.

(2B) The data amount of the object recognition information is smaller than that of the image information 23. In the second embodiment, the vehicle information 29 including the object recognition information is transmitted in place of the image information 23 from the vehicle 3 to the center 5, so that the data transmission amount can be reduced.

Third Embodiment

1. Points Different from First Embodiment

Since the basic configuration of a third embodiment is similar to that of the first embodiment, the different points will be described. The same reference numerals as those of the first embodiment have the same configurations, so that the foregoing description is to be referred to.

In the above-described first embodiment, the capture device is the camera 22, and the external information is the image information 23. The third embodiment is different from the first embodiment with respect to the points that the capture device is a lidar and the external information is object recognition information obtained by performing the object recognizing process on an output of the lidar. This different point will be described concretely.

The vehicle 3 has a lidar as the capture device. In step 1, the image data acquisition unit 19 obtains information of the surrounding of the vehicle 3 by using the lidar in place of the process of obtaining the image information 23. The image data acquisition unit 19 performs the object recognizing process on the obtained information to obtain object recognition information. In the object recognizing process, the landmarks L1, L2, and L3 are recognized. The object recognition information includes the coordinates of the landmarks L1, L2, and L3. The object recognition information corresponds to the external information.

The vehicle information 29 generated in the step 3 and transmitted to the center 5 includes the object recognition information obtained in the step 1, the location information 27, the parameters of the lidar, and the vehicle identification information 31.

After the calibration unit 49 reads the vehicle information 29 in step 103, the process skips step 104 and advances to processes in step 105 and subsequent steps. Since the vehicle information 29 includes the coordinates of the landmarks L1, L2, and L3, the process of the step 104 (that is, the process of performing the image recognizing process on the image information 23, recognizing the landmarks L1, L2, and L3, and obtaining the coordinates of the landmarks L1, L2, and L3) is unnecessary.

In the third embodiment, calibration information is information expressing the position and the direction of the lidar.

According to the third embodiment specifically described above, in addition to the effects of the first embodiment, the following effects are produced.

(3A) The vehicle 3 performs the object recognizing process on an output of the lidar to generate object recognition information. The object recognition information includes the coordinates of the landmarks L1, L2, and L3. The vehicle 3 transmits the vehicle information 29 including the object recognition information to the center 5.

Since the vehicle information 29 received by the center 5 includes the coordinates of the landmarks L1, L2, and L3, the center 5 does not have to perform the process of the step 104. As a result, the process burden on the center 5 can be lessened.

(3B) The data amount of the object recognition information is smaller than that of the image information 23. In the third embodiment, the vehicle information 29 including the object recognition information is transmitted in place of the image information 23 from the vehicle 3 to the center 5, so that the data transmission amount can be reduced.

OTHER EMBODIMENTS

Although the embodiments of the present disclosure have been described above, the present disclosure is not limited to the foregoing embodiments and can be variously modified.

(1) The method of obtaining the calibration information 25 may be the following method. In the step 103, a plurality of pieces of the vehicle information 29 of a single target vehicle is read from the database 43. The plurality of pieces of the vehicle information 29 is the vehicle information 29 received from the same vehicle 3.

Subsequently, with respect to each of the plurality of pieces of the vehicle information 29, the calibration information 25 is obtained by the method of the steps 104 to 108. As a result, a plurality of pieces of the calibration information 25 is obtained with respect to a single target vehicle. An average value of the plurality of pieces of the calibration information 25 obtained is employed as the calibration information 25 to be recorded in the step 109. In this case, the precision of the calibration information 25 can be further increased.

(2) The vehicle 3 may have the ECUs 7, 9, and 11 illustrated in FIG. 11. The ECU 7 functions as the subject vehicle location measurement unit 15. The ECU 9 functions as the data transmission and reception unit 13 and the data collection and distribution unit 17. The data transmission and reception unit 13 is, for example, a communication device communicating with the center 5. The data collection and distribution unit 17 collects the image information 23 and the location information 27. The ECU 11 is connected to the camera 22. The ECU 11 functions as the image data acquisition unit 19. In this case, it is easy to configure the vehicle 3 by using the camera 22 for data collection. The ECU 11 corresponds to a first ECU, the ECU 7 corresponds to a second ECU, and the ECU 9 corresponds to a third ECU.

Figure 12:
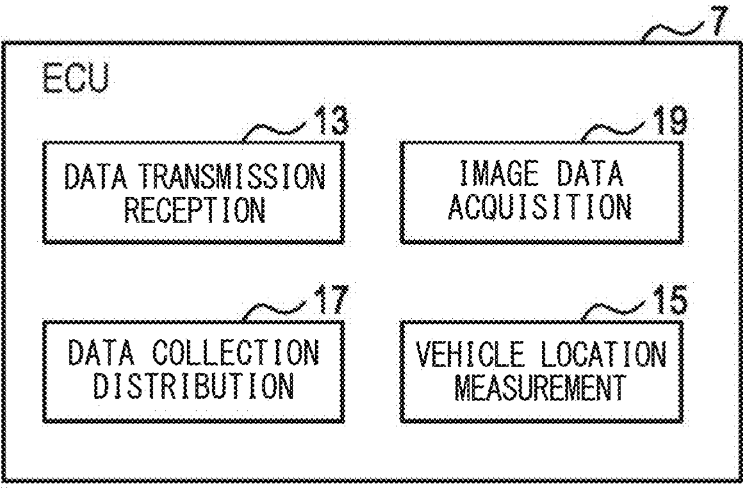
FIG. 12 is an explanatory diagram illustrating another mode of an ECU of a vehicle.

(3) The vehicle 3 may have the ECU 7 illustrated in FIG. 12. The ECU 7 is connected to the camera 22. The ECU 7 functions as the data transmission and reception unit 13, the subject vehicle location measurement unit 15, the data collection and distribution unit 17 and the image data acquisition unit 19. The data transmission and reception unit 13 is, for example, a communication device communicating with the center 5. In this case, it is easy to configure the vehicle 3 by the ECU 7 of the drive recorder.

(4) The center 5 may have a map in which the camera parameter 33 and the vehicle identification information 31 are associated. In this case, the center 5 can obtain the camera parameter 33 of the target vehicle by referring to the vehicle identification information 31 included in the vehicle information 29 transmitted from the target vehicle and the map. In this case, the vehicle information 29 may not include the camera parameter 33.

(5) The vehicle 3 may be provided with two or more cameras 22. In this case, the vehicle information 29 includes the image information 23 obtained by each of the cameras 22 and the camera parameter 33 of each of the cameras 22. The center 5 obtains the calibration information 25 with respect to each of the cameras 22.

(6) The control unit 41 and its method described in the present disclosure may be realized by a dedicated computer provided by constructing a processor programmed to execute one or plural functions embodied by a computer program and a memory. The control unit 41 and its method described in the present disclosure may be also realized by a dedicated computer provided by constructing a processor by one or more dedicated hardware logic circuits. The control unit 41 and its method described in the present disclosure may be also realized by one or more dedicated computers configured by a combination of a processor programmed to execute one or plural functions, a memory, and one or more hardware logic circuits. The computer program may be recorded as an instruction executed by a computer in a computer-readable non-transitory tangible recording medium. The method of realizing the function of each of parts included in the control unit 41 does not always have to include software, and the functions of all of the parts may be realized by using one or plurality of pieces of hardware.

(7) A plurality of functions of a single component in the foregoing embodiments may be realized by a plurality of components, or a single function of a single component may be realized by a plurality of components. A plurality of functions of a plurality of components may be realized by a single component, or a single function realized by a plurality of components may be realized by a single component. A part of the configurations of the foregoing embodiments may be omitted. At least a part of the configurations of the foregoing embodiment may be added or replaced to/with the configuration of another embodiment.

(8) The present disclosure can be realized not only by the above-described information management system 1 but also by various modes such as a high-order system using the information management system as a component, a program for making a computer function as the control unit 41, a non-transitory tangible recording medium such as a semiconductor memory in which the program is recorded, an information collecting method, and an information processing method.

What is claimed is:

1. An information management system configured to manage information to be provided to an information utilizer from a center, the information management system comprising:

a vehicle; and the center, wherein:

the vehicle includes at least one of a first circuit and a first processor with a first memory storing first computer program code executable by the first processor configured to serve as:

an external information acquisition unit configured to obtain external information by using a capture device which is provided for the vehicle and capable of recognizing a landmark;

a location information acquisition unit configured to obtain location information expressing a location of the vehicle;

a vehicle information transmission unit configured to transmit to the center, vehicle information including the external information and the location information at a time when the external information is obtained; and a calibration information reception unit, and the center includes:

at least one of a second circuit and a second processor with a second memory storing second computer program code executable by the second processor configured to serve as:

a vehicle information reception unit configured to receive the vehicle information transmitted from the vehicle information transmission unit;

a calibration information acquisition unit configured to obtain calibration information of the capture device by computation using the external information included in the vehicle information received by the vehicle information reception unit, the external information including information representing a landmark recognized by the capture device, the location information included in the vehicle information and representing the location of the vehicle at the time the external information is obtained, and a map information database in which a location of the landmark is recorded;

a recording unit recording the external information and the location information included in the vehicle information received by the vehicle information reception unit, and the calibration information obtained by the calibration information acquisition unit on a basis of the vehicle information; and a calibration information transmission unit configured to transmit the calibration information to the vehicle as a transmission source of the vehicle information used to obtain the calibration information, the calibration information reception unit receives configured to receive the calibration information transmitted by the calibration information transmission unit, and the vehicle information transmission unit transmits, together with subsequently obtained vehicle information, the calibration information to the center after receiving the calibration information.

2. The information management system according to claim 1, wherein the calibration information acquisition unit determines whether resources of a computer functioning as the calibration information acquisition unit are insufficient or not, and when it is determined that the resources are not insufficient, the calibration information acquisition unit obtains the calibration information by computation.

3. The information management system according to claim 1, wherein the calibration information acquisition unit obtains the calibration information when a request to provide information is received from the information utilizer.

4. The information management system according to claim 1, wherein the calibration information acquisition unit is configured to obtain calibration information with respect to each of a plurality of pieces of vehicle information received from the vehicle, and employ an average value of the plurality of pieces of calibration information obtained as the calibration information.

5. The information management system according to claim 1, wherein the vehicle includes a first ECU connected to the capture device, a second ECU having a communication device performing communication with the center, and a third ECU having a relay function of an in-vehicle network, the first ECU functions as the external information acquisition unit, the second ECU functions as the location information acquisition unit and the vehicle information transmission unit, and the third ECU is configured to collect the external information and distribute the external information to the second ECU.

6. The information management system according to claim 1, wherein the vehicle includes a first ECU connected to the capture device, a second ECU, and a third ECU having a communication device performing communication with the center, the first ECU functions as the external information acquisition unit, the second ECU functions as the location information acquisition unit, and the third ECU collects the external information and the location information and functions as the vehicle information transmission unit.

7. The information management system according to claim 1, wherein the vehicle has one ECU which is an ECU having a communication device performing communication with the center and connected to the capture device, and which functions as the external information acquisition unit, the location information acquisition unit, and the vehicle information transmission unit.

* * * * *